US010742380B2

(12) United States Patent
Lee et al.

(10) Patent No.: US 10,742,380 B2
(45) Date of Patent: Aug. 11, 2020

(54) METHOD FOR TRANSMITTING V2X MESSAGE PERFORMED BY TERMINAL IN WIRELESS COMMUNICATION SYSTEM, AND TERMINAL USING THE METHOD

(71) Applicant: LG ELECTRONICS INC., Seoul (KR)

(72) Inventors: Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/754,247

(22) PCT Filed: Aug. 25, 2016

(86) PCT No.: PCT/KR2016/009471
§ 371 (c)(1),
(2) Date: Feb. 21, 2018

(87) PCT Pub. No.: WO2017/034358
PCT Pub. Date: Mar. 2, 2017

(65) Prior Publication Data
US 2018/0262312 A1    Sep. 13, 2018

Related U.S. Application Data

(60) Provisional application No. 62/209,355, filed on Aug. 25, 2015.

(51) Int. Cl.
*H04W 4/00* (2018.01)
*H04L 5/00* (2006.01)
(Continued)

(52) U.S. Cl.
CPC .............. *H04L 5/0053* (2013.01); *H04L 1/00* (2013.01); *H04L 1/1812* (2013.01); *H04L 5/00* (2013.01);
(Continued)

(58) Field of Classification Search
USPC .......................................................... 370/329
See application file for complete search history.

(56) References Cited

U.S. PATENT DOCUMENTS 9,807,786 B2 * 10/2017 Seo ........................ H04L 1/0007
2008/0310535 A1 * 12/2008 Kwon ................... H04L 5/0007
375/260
(Continued)

FOREIGN PATENT DOCUMENTS

WO      2015037913       3/2015

OTHER PUBLICATIONS

Ericsson, "Configuration Parameters, Traffic Models, and Performance Metrics for V2X Simulators," R1-154435, 3GPP TSG RAN WG1 Meeting #82, Beijing, P.R. China, Aug. 14, 2015, see section 2 and table 1.
Huawei, Hisilicon, "DMRS Enhancement for V2V," R1-153801, 3GPP TSG RAN WG1 Meeting #82, Beijing, China, Aug. 15, 2015.
(Continued)

*Primary Examiner* — Phuongchau Ba Nguyen
(74) *Attorney, Agent, or Firm* — Dentons US LLP

(57) ABSTRACT

The present invention relates to a method for transmitting a vehicle to X (V2X) message performed by a terminal in a wireless communication system, characterized by mapping a coded symbol related to the V2X message on a subframe, and transmitting the V2X message based on the subframe, wherein a plurality of systematic bits and a plurality of parity bits are mapped on the subframe based on the mapping by the coded symbol.

4 Claims, 16 Drawing Sheets

(51) Int. Cl.
*H04L 1/00* (2006.01)
*H04L 1/18* (2006.01)
*H04W 76/14* (2018.01)
*H04W 84/00* (2009.01)
*H04W 4/40* (2018.01)
*H04W 72/04* (2009.01)
*H04W 84/18* (2009.01)

(52) U.S. Cl.
CPC ........... *H04L 5/0044* (2013.01); *H04W 76/14* (2018.02); *H04L 1/1845* (2013.01); *H04L 1/1896* (2013.01); *H04L 5/0007* (2013.01); *H04W 4/40* (2018.02); *H04W 72/042* (2013.01); *H04W 72/0446* (2013.01); *H04W 84/005* (2013.01); *H04W 84/18* (2013.01)

(56) References Cited

U.S. PATENT DOCUMENTS

| | | | |
|---|---|---|---|
| 2012/0195286 A1* | 8/2012 | Kim | H04L 5/0007 370/330 |
| 2015/0085809 A1 | 3/2015 | Hoshino et al. | |
| 2016/0119083 A1* | 4/2016 | Zhao | H04L 1/0071 375/267 |
| 2017/0006592 A1* | 1/2017 | Hoshino | H04L 1/0026 |
| 2018/0262312 A1* | 9/2018 | Lee | H04L 1/00 |

OTHER PUBLICATIONS

Ericsson, "Considerations on the LTE V2X Feasibility Study," R1-154434, 3GPP TSG RAN WG1 Meeting #82, Beijing, China, Aug. 14, 2015, see section 3.
3GPP TS 36.211 V8.5.0, Dec. 2008.

* cited by examiner

METHOD FOR TRANSMITTING V2X MESSAGE PERFORMED BY TERMINAL IN WIRELESS COMMUNICATION SYSTEM, AND TERMINAL USING THE METHOD

CROSS-REFERENCE TO RELATED APPLICATIONS

This application is the National Stage filing under 35 U.S.C. 371 of International Application No. PCT/KR2016/009471, filed on Aug. 25, 2016, which claims the benefit of U.S. Provisional Application No. 62/209,355 filed on Aug. 25, 2015, the contents of which are all hereby incorporated by reference herein in their entirety.

BACKGROUND OF THE INVENTION

Field of the Invention

The present invention relates to wireless communication, and more particularly, to a V2X message transmission method performed by a user device in a wireless communication system and the user device performing the method.

Related Art

In the International Telecommunication Union Radio Communication sector (ITU-R), standardization of International Mobile Telecommunication (IMT)-Advanced, which is a next generation mobile communication system after 3rd generation, is underway. IMT-Advanced aims to support IP (Internet Protocol) based multimedia service at a data transfer rate of 1 Gbps in a stationary and low-speed moving state, and at a data transfer rate of 100 Mbps in a high-speed moving state.

The 3rd Generation Partnership Project (3GPP) is preparing, as a system standard meeting the requirements of IMT-Advanced, the LTE-Advanced (LTE-A), an improved version of LTE (Long Term Evolution), based on OFDMA (Orthogonal Frequency Division Multiple Access)/SC-FDMA (Single Carrier-Frequency Division Multiple Access) transmission scheme. LTE-A is one of the strong candidates for IMT-Advanced.

In one example, generally, the D2D operation may have various advantages in that the D2D operation refers to transmission and reception of signals between adjacent devices. For example, a D2D device can communicate data at high transmission rates and low latency. In addition, D2D operation may distribute traffic which may otherwise concentrate on the base station. If the D2D device acts as a relay device, the D2D device can also extend the coverage of the base station.

The extension of D2D communication described above includes signal transmission and reception between vehicles. The communication associated with the vehicle is specifically referred to as V2X (VEHICLE-TO-X) communication.

When the user device sends/receives a V2X-related message, that is, a V2X message, the user device performs coded symbol mapping. That is, systematic bit(s) and parity bit(s) are mapped to a subframe (hereinafter referred to as V2X message subframe) for transmitting and receiving V2X messages. As a result, transmission and reception of a V2X message may be performed.

When the V2X message is sent or received, the bit(s) mapped to the V2X message subframe may be damaged in two following ways. First, 1) on the time domain, the front portion of the V2X message subframe corresponds to the region affected by AGC (automatic gain control). As a result, the bits located in the front end of the V2X message subframe on the time domain are affected by the AGC, thereby corrupting the bits located at the front end of the V2X message subframe. Further, 2) on the time domain, the rear portion of the V2X message corresponds to the region that can be affected by WAN communication. Thus, there is a possibility that the bits located in the rear end of the V2X message subframe on the time domain may be corrupted.

Accordingly, the present invention aims to provide a V2X message transmission and/or reception method in order to solve the above problems.

SUMMARY OF THE INVENTION

The present invention provides a V2X message transmission method performed by a user device in a wireless communication system, and a user device performing the method.

In an aspect, a method for Vehicle to X (V2X) message transmission performed by a user equipment (UE) in a wireless communication system is provided. The method may comprise mapping a coded symbol related to the V2X message to a subframe, and transmitting the V2X message based on the subframe, A plurality of systematic bits and a plurality of parity bits may be mapped to the subframe based on the mapping of the coded symbol.

The mapping may be performed in a time axis direction on the subframe.

The mapping may include mapping the plurality of systematic bits in the time axis direction on the subframe, and thereafter, mapping the plurality of parity bits in the time axis direction on the subframe.

The subframe may include a plurality of symbols along a time axis, wherein the mapping is performed in a frequency axis direction from a pre-defined symbol among the plurality of symbols of the subframe.

The mapping may include mapping the plurality of systematic bits on the subframe in a frequency axis direction from a second symbol of the subframe, and thereafter, mapping the plurality of parity bits on the subframe in a frequency axis direction.

The mapping may include mapping the plurality of parity bits on the subframe in a frequency axis direction, and thereafter, mapping the plurality of systematic bits on the subframe in a frequency axis direction.

The subframe may include a plurality of symbols along a time axis, wherein the systematic bit is mapped to a symbol other than a first symbol and a last symbol among the plurality of symbols of the subframe.

The subframe may be configured based on an Orthogonal Frequency Division Multiplexing (OFDM) format.

The V2X message may be a Device To Device (D2D) message.

In another aspect, a user equipment (UE) is provided. The UE may comprise a radio frequency (RF) unit configured for transmitting and receiving a radio signal, and a processor coupled to the RF unit. The processor may be configured for mapping a coded symbol related to the V2X message to a subframe, and controlling the RF unit to transmit the V2X message based on the subframe. a plurality of systematic bits and a plurality of parity bits may be mapped to the subframe based on the mapping of the coded symbol.

In accordance with one embodiment of the present invention, there is provided a V2X message transmission method performed by a user device in a wireless communication system, and there is provided a user device performing the method.

In accordance with one embodiment of the present invention, when transmitting the V2X message, the number of systematic bits located at the front end of the V2X message subframe on the time domain is minimized, and, thus, the number of systematic bits affected by interference such as AGC etc. may be minimized. In addition, the number of systematic bits located at the rear end of the V2X message subframe on the time domain may be minimized, and, thus, the number of systematic bits affected by interference such as AGC etc. may be minimized. Accordingly, when bit mapping according to the present invention is used, the corrupted data can be minimized, the stability and overall efficiency of the wireless communication system is increased.

DESCRIPTION OF EXEMPLARY EMBODIMENTS

Figure 1:
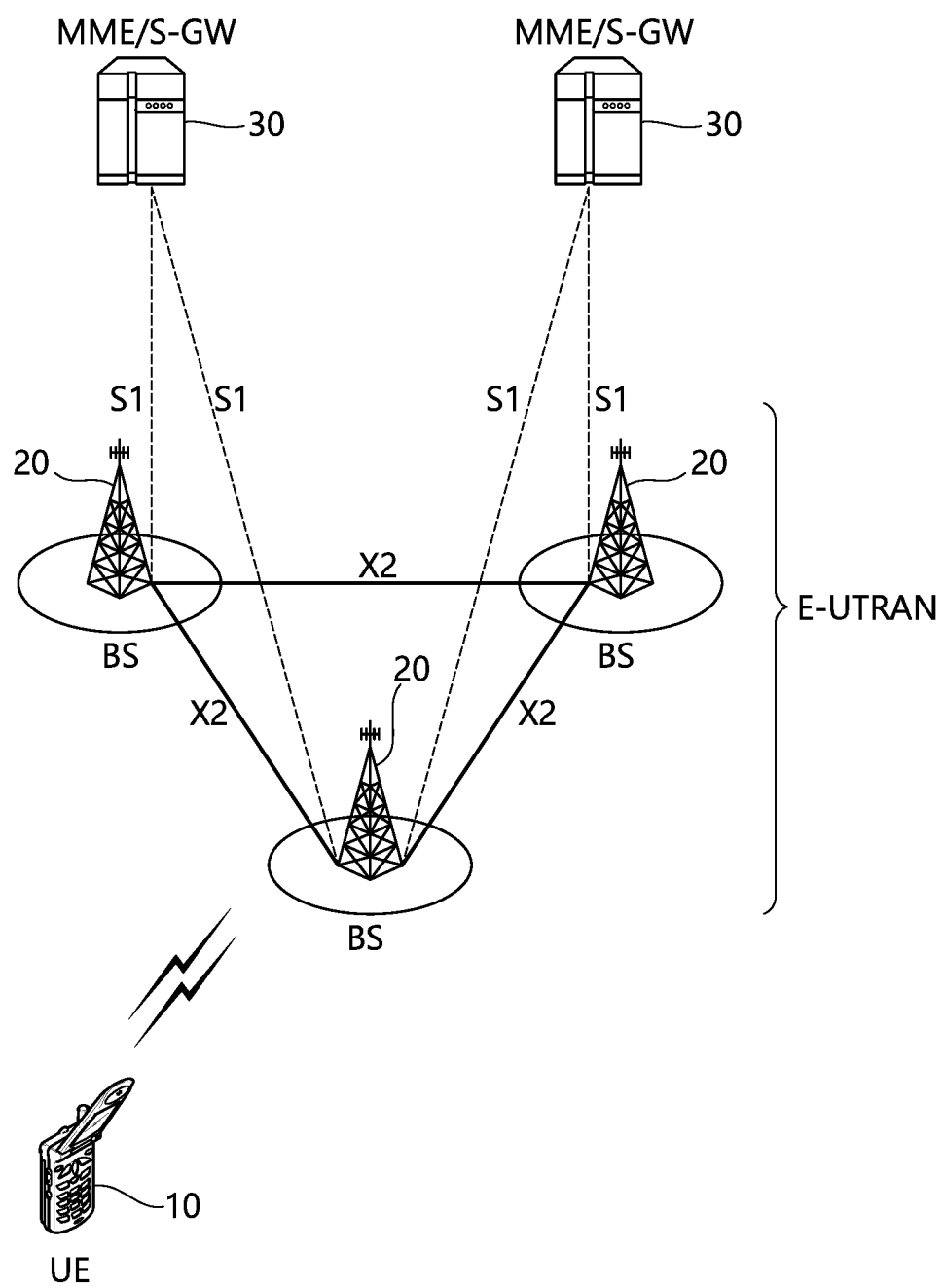
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
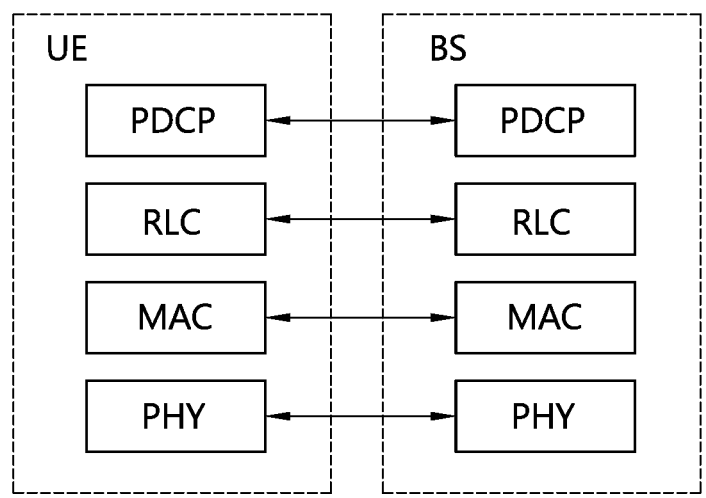
FIG. 2 is a diagram showing a wireless protocol architecture for a user plane.
Figure 3:
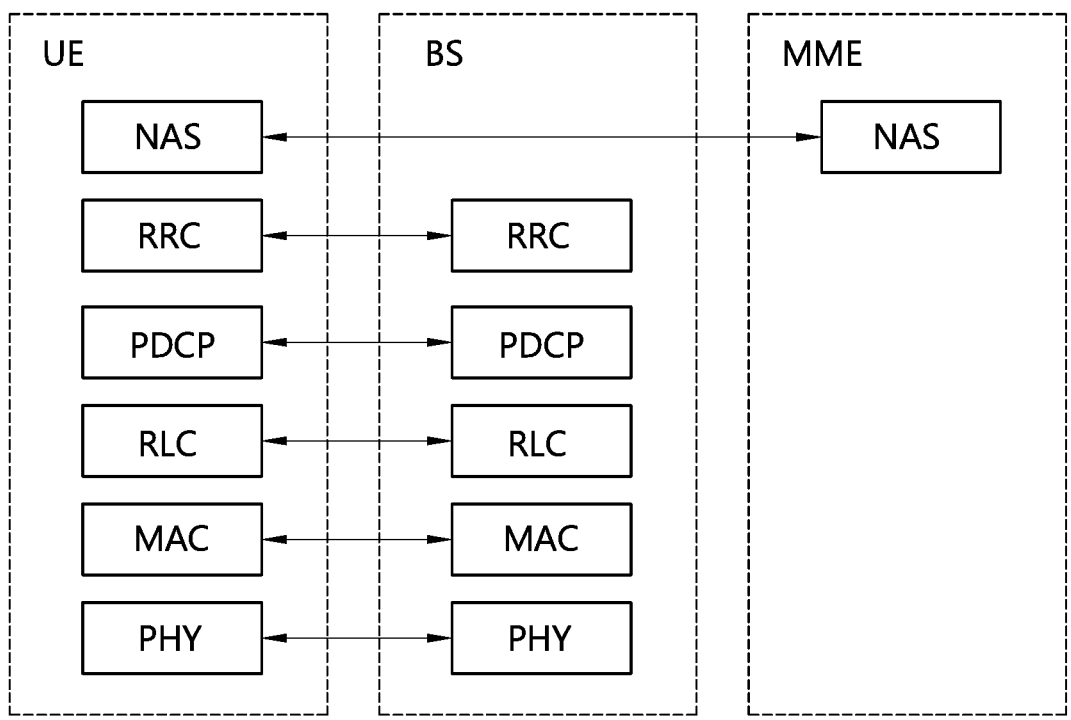
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Figure 4:
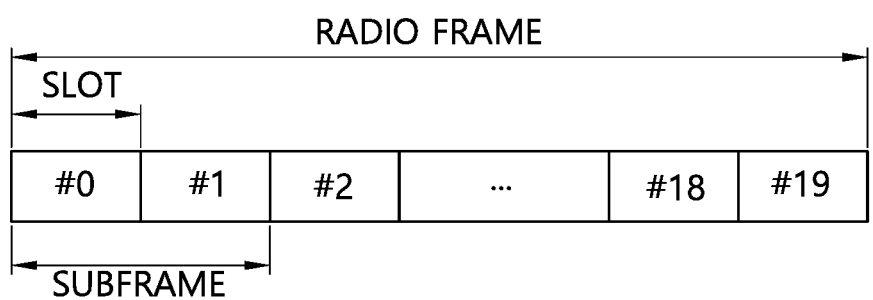
FIG. 4 illustrates a radio frame structure of 3GPP LTE.

FIG. 4 illustrates a radio frame structure of 3GPP LTE.

Referring to FIG. 4, a radio frame is constituted by 10 subframes and one subframe is constituted by two slots. As one example, a length of one subframe may be 1 ms and the length of one slot may be 0.5 ms. A time required for transmitting one subframe is referred to as a transmission time interval (TTI). The TTI may be a minimum unit of scheduling. The structure of the radio frame is merely an example and the number of subframes included in the radio frame and the number of slots included in the subframe may be variously changed.

Figure 5:
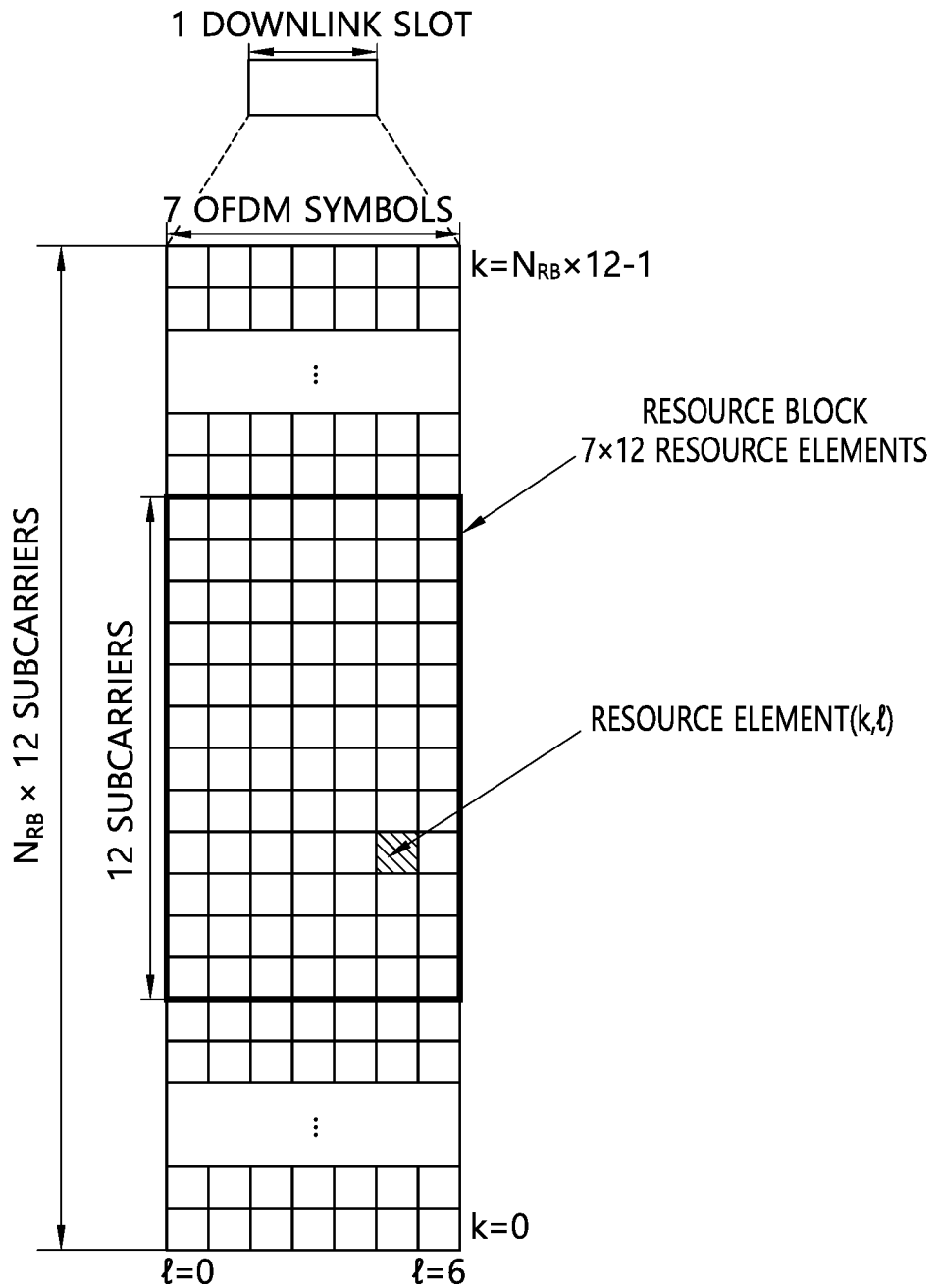
FIG. 5 is an exemplary diagram illustrating a resource grid for one downlink slot.

FIG. 5 is an exemplary diagram illustrating a resource grid for one downlink slot.

One slot in the radio frame includes a plurality of orthogonal frequency division multiplexing (OFDM) symbols in a time domain. The OFDM symbol is used to represent one symbol period because 3GPP LTE uses OFDMA in a downlink and may be referred to as another name depending on a multiple access scheme. For example, when SC-FDMA is used, the OFDM symbol may be referred to as an SC-FDMA symbol. It is exemplarily described that one slot includes 7 OFDM symbols, but the number of OFDM symbols included in one slot may be changed according to the length of a cyclic prefix (CP). According to 3GPP TS 36.211 V8.5.0 (2008-12), one subframe in a normal CP includes 7 OFDM symbols and one subframe in an extended CP includes 6 OFDM symbols.

In addition, one slot includes a plurality of resource blocks (RBs) in a frequency domain. A resource block includes a plurality of consecutive subcarriers in one slot as a resource allocation unit. In the resource block, the subcarrier may have an interval of 15 KHz, for example.

Each element on the resource grid is referred to as a resource element (RE) and one resource block includes 12×7 resource elements. The number of resource blocks, $N_{DL}$ included in a downlink slot depends on a downlink transmission bandwidth set in a cell. The resource grid described in FIG. 5 may be applied even in an uplink.

Figure 6:
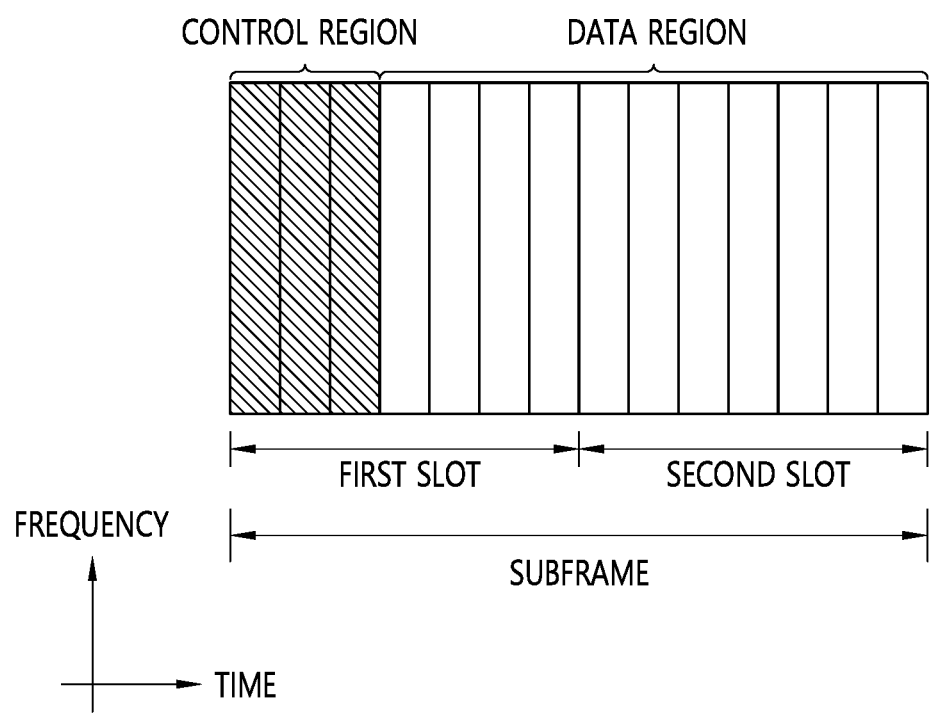
FIG. 6 illustrates a structure of a downlink subframe.

FIG. 6 illustrates a structure of a downlink subframe.

Referring to FIG. 6, the subframe includes two consecutive slots. A former maximum of 3 OFDM symbols of a first slot in the subframe are control regions to which control channels are allocated and the remaining OFDM symbols are data regions to which a data channel is allocated. The control region may be constituted by a maximum of 4 OFDM symbols according to a system band.

The control channels allocated to the control region include a physical control format indication channel (PCFICH), a physical hybrid-ARQ indicator channel (PHICH), and a physical downlink control channel (PDCCH). The PCFICH is a control channel through which information indicating the size of the control region, that is, the number of OFDM symbols constituting the control region is transmitted. The PHICH is a control channel for carrying acknowledgment/not-acknowledgment (ACK/NACK) for uplink data transmission of the UE. The PDCCH may carry resource allocation (also referred to as a downlink (DL) grant) and a transmission format of a downlink-shared channel (DL-SCH), resource allocation information (also referred to as an uplink (UL) grant) of an uplink shared channel (UL-SCH), paging information on a paging channel (PCH), system information on the DL-SCH, resource allocation of an upper layer control message such as a random access response transmitted on a PDSCH, activation of a set of transmission power control (TPC) commands for individual UEs in a predetermined UE group and a voice over Internet protocol (VoIP), and the like. Control information transmitted through the PDCCH is referred to as downlink control information (DCI).

DCI formats include format 1 for physical uplink shared channel (PUSCH) scheduling, format 1 for scheduling one PDSCH codeword, format 1A for compact scheduling of one PDSCH codeword, format 1B for compact scheduling for rank-1 transmission of a single codeword in a spatial multiplexing mode, format 1C for very compact scheduling of the downlink shared channel (DL-SCH), format 1D for PDSCH scheduling in a multi-user spatial multiplexing mode, format 2 for PDSCH scheduling in a closed-loop spatial multiplexing mode, format 2A for PDSCH scheduling in an open-loop spatial multiplexing mode, format 3 for transmitting a 2-bit power control transmission power control TPC) command for the PUCCH and the PUSCH, and format 3A transmitting a 1-bit power control TPC command of the PUCCH and the PUSCH.

Figure 7:
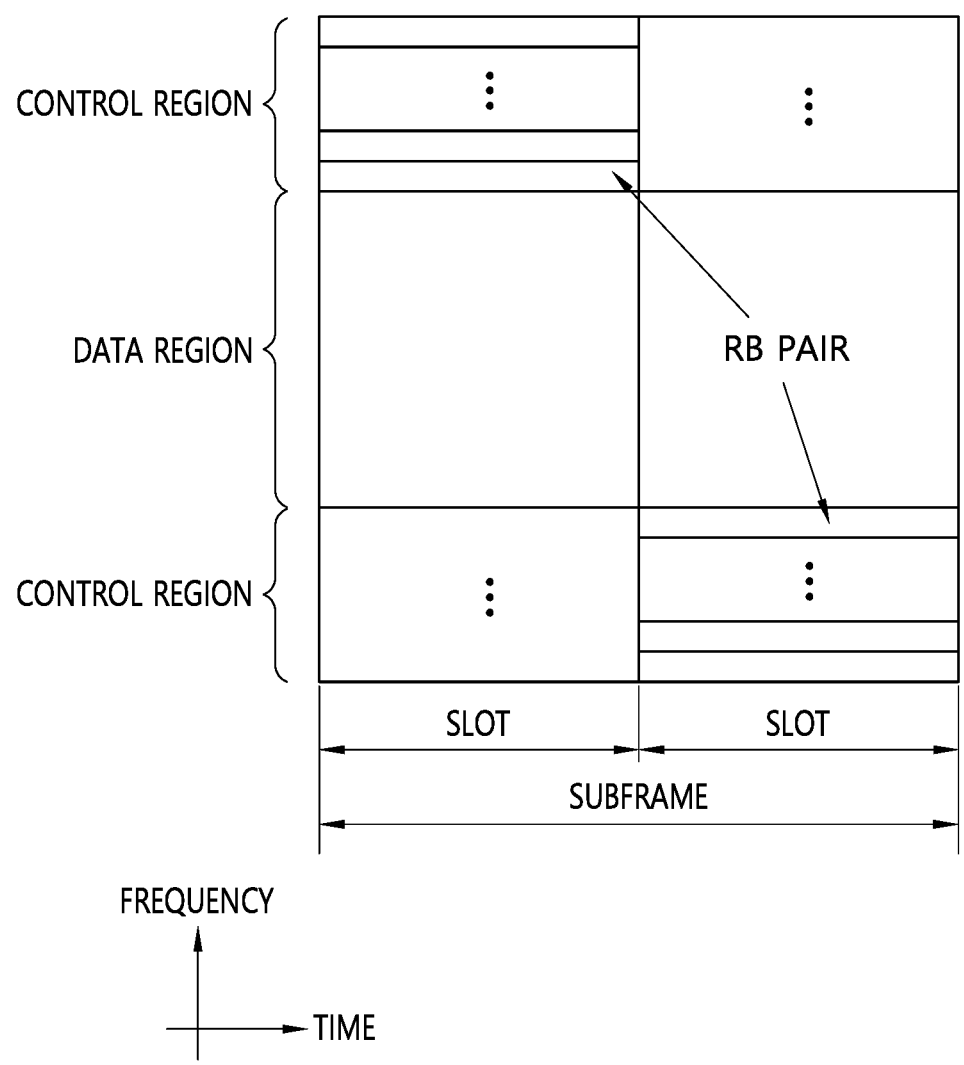
FIG. 7 illustrates the structure of an uplink subframe.

FIG. 7 illustrates the structure of an uplink subframe.

Referring to FIG. 7, the uplink subframe may be divided into a control region to which the physical uplink control channel (PUCCH) for carrying uplink control information is allocated and a data region to which the physical uplink shared channel (PUSCH) for carrying user data is allocated in a frequency domain.

The PUCCH for one UE is allocated to a pair of resource blocks (RBs) and the RBs which belong to the pair of RBs occupy different subcarriers in two slots, respectively. In this case, the pair of RBs allocated to the PUCCH frequency-hop in a slot boundary.

<Channel Coding, Rate Matching and Redundancy Version>

In a wireless communication system, since a signal is transmitted over a wireless channel, the probability of error occurrence is high. Therefore, in order to correct an error occurring in the wireless channel at the receiving end, information is encoded at the transmission end using an error correction code, and then the encoded information is transmitted. This is called channel coding. At the receiving end, after decoding the received signal, the receiving end decodes the error correction code and then reconstruct the information sent by the transmission end. That is, the receiving end corrects an error on the received signal over the radio channel during the decoding process. There are various kinds of error correction codes, for example, turbo codes.

The turbo code includes a recursive systematic convolution encoder and an interleaver. The turbo code includes an interleaver to facilitate parallel decoding. Interleaving by the interleaver is to reduce the effect by the burst error generated when transmitting a signal on a wireless channel. One example of the interleaver may be a quadratic polynomial permutation (QPP) interleaver.

Meanwhile, turbo code performance is known to be better as the data block size increases. In an actual communication system, for convenience of implementation, a data block of a predetermined size or larger is divided into several small data blocks, and the divided blocks are encoded.

The divided data blocks are called code blocks. Code blocks generally have the same size, but due to the size limitation of the QPP interleaver, one or more code blocks of multiple code blocks may have different sizes.

Meanwhile, when the amount of radio resources used for signal transmission is constant, rate matching may be performed on the encoded code block to match the amount of radio resources. The rate matching may include puncturing or repetition.

Rate matching may also be performed on an encoded code block basis. Alternatively, the encoded code block may be divided into a systematic portion (or systematic bit) and a parity portion (or parity bit) and, then, the rate matching may be performed separately on the systematic portion (or systematic bit) and parity portion (or parity bit).

Figure 8:
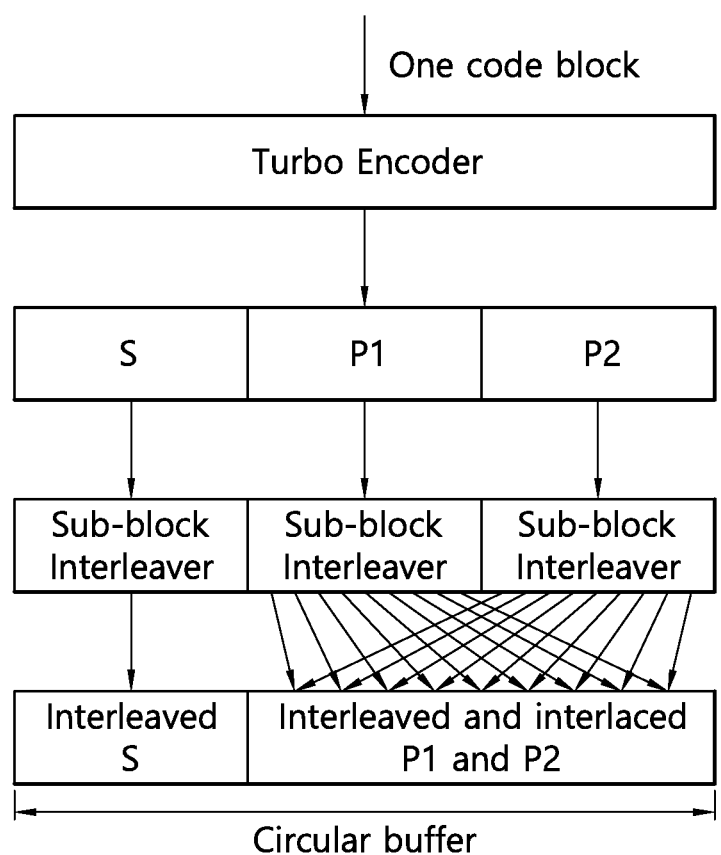
FIG. 8 shows an example of rate matching.

FIG. 8 shows an example of rate matching.

Referring to FIG. 8, one code block may be divided into a systematic portion S and a parity portion P1 and P2 via encoding by a turbo encoder. Thereafter, rate matching may be performed separately for each of the systematic portion S and the parity portion P1, P2. In FIG. 8, it is assumed that the code rate is 1/3.

Meanwhile, HARQ may be a combination of channel coding and automatic repeat request (ARQ) techniques. In the HARQ scheme, a data block with an error is retransmitted and the retransmitted data block is combined with a previously transmitted data block. This improves decoding performance.

The HARQ may be classified into an asynchronous HARQ scheme and a synchronous HARQ scheme based on the regularity of the occurrence timing of re-transmission. In the asynchronous HARQ, the re-transmission timing varies, while the timing of re-transmission in synchronous HARQ is fixed.

Further, the HARQ may be classified into CC (chase combining) scheme and IR (incremental redundancy) scheme based on the type of redundancy version (RV) used in re-transmission. In this connection, the redundancy version may be information indicating the starting point of the transmission on the circular buffer. The redundancy version may be included and transmitted in the DCI.

Figure 9:
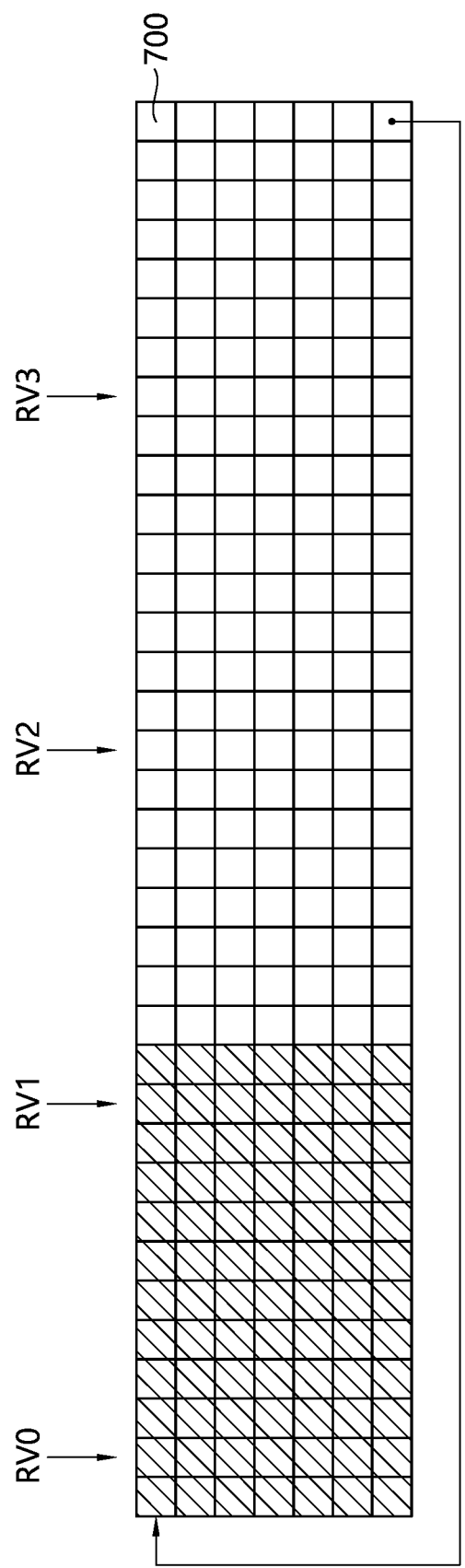
FIG. 9 shows an example of defining RVs in a system using a circular buffer.

FIG. 9 shows an example of defining RVs in a system using a circular buffer.

Referring to FIG. 9, RV 0, RV 1, RV 2, and RV 3 denote the starting points of transmission on the circular buffer 700, respectively. There are four RVs, but this is only an example. The spacing between the points on the circular buffer indicated by the RVs may be a value resulting from the total circular buffer size being divided by the number of RVs.

Assuming that the turbo code's code rate is 1/3, the front 1/3 portion of the circular buffer 700 may be a systematic portion, and the rear 2/3 portion of the buffer 700 may be a parity portion.

In the CC scheme, the same data block as the previously transmitted data block is retransmitted, thereby obtaining the gain of signal-to-noise ratio (SNR). This may mean that a data block with the same redundancy version is re-transmitted.

To the contrary, in the IR scheme, a data block including a different redundancy version from that of a previous-transmitted data block is transmitted such that a coding gain is obtained. In the IR scheme, when decoding is attempted by combining a currently re-transmitted data block with a previously received data block, and when the re-transmitted data block does not overlap with the previous transmitted data block, the decoding performance tends to be poor. Therefore, when the circular buffer is used and the number of RVs is 4, good performance may be achieved when the order of the RVs is RV 0, RV 2, RV 3, RV 1 or RV 0, RV 2, RV 1, RV 3.

When the HARQ is applied in a system using rate matching using a circular buffer, the IR scheme may be implemented by specifying the starting points of transmission of the data block on the circular buffer. In this connection, the starting points on the circular buffer must be defined such that the number of the points is equal to the number of RVs.

Meanwhile, when transmitting a data block, signaling is required to indicate whether the currently transmitted data block is a new data block. This is called a new data indicator (NDI). A signaling scheme is available that explicitly informs the NDI and the RV currently being transmitted.

In the synchronous HARQ, both the transmitting end and the receiving end know the data block transmission timing. As such, instead of NDI, a retransmission sequence number (RSN) may be used. The specific value of the RSN may be predefined as a value indicating the initial transmission. For example, the '0' value of an RSN may indicate the initial transmission. If the RSN is represented by 2 bits, transmission of RSN is performed in order of 0, 1, 2, and 3, and after the fourth transmission, the RSN may be continuously kept to be 3.

The present invention will be described below.

In one example, generally, the D2D operation may have various advantages in that the D2D operation refers to transmission and reception of signals between adjacent devices. For example, a D2D device can communicate data at high transmission rates and low latency. In addition, D2D operation may distribute traffic which may otherwise concentrate on the base station. If the D2D device acts as a relay device, the D2D device can also extend the coverage of the base station.

In one example, in legacy cellular communication, there is a cell-specific reference signal that is transmitted periodically. Therefore, a separate automatic gain control (AGC) period is unnecessary. However, in D2D communication, there is no repeatedly-transmitted reference signal, such as a cell specific reference signal. Therefore, the AGC stabilization period needs to be included in the initial D2D signal transmission. That is, in D2D communication, because the user device directly transmits the signal, signal transmission point, frequency resource, etc., may vary from subframe to subframe. Therefore, the AGC stabilization period should be included in the D2D signal transmission. Thereby, the influence of the fluctuation of the average power generated due to the change of the signal transmission timings between subframes may be reduced.

The extension of D2D communication described above includes signal transmission and reception between vehicles. The communication associated with the vehicle is specifically referred to as V2X (VEHICLE-TO-X) communication. In this connection, in one example, V2X (VEHICLE-TO-X), 'X' may refer to PEDESTRIAN (COMMUNICATION BETWEEN A VEHICLE AND A DEVICE CARRIED BY AN INDIVIDUAL (for example, HANDHELD TERMINAL CARRIED BY A PEDESTRIAN, CYCLIST, DRIVER OR PASSENGER)) (V2P), VEHICLE (COMMUNICATION BETWEEN VEHICLES) (V2V), INFRASTRUCTURE/NETWORK (COMMUNICATION BETWEEN A VEHICLE AND A ROADSIDE UNIT (RSU)/NETWORK (for example, RSU IS A TRANSPORTATION INFRASTRUCTURE ENTITY (for example, AN ENTITY TRANSMITTING SPEED NOTIFICATIONS) IMPLEMENTED IN AN eNB OR A STATIONARY UE)) (V2I/N). In one example, for convenience of explanation of the proposed method, a device (related to V2P communication) owned by a pedestrian (or person) is named "P-UE". A device (related to V2X communication) installed in VEHICLE is called "V-UE". Further, in one example, in the present invention, the term 'ENTITY' may be interpreted as P-UE and/or V-UE and/or RSU (/NETWORK/INFRASTRUCTURE).

When the user device sends/receives a V2X-related message, that is, a V2X message, the user device performs coded symbol mapping. That is, systematic bit(s) and parity bit(s) are mapped to a subframe (hereinafter referred to as V2X message subframe) for transmitting and receiving V2X messages. As a result, transmission and reception of a V2X message may be performed.

When the V2X message is sent or received, the bit(s) mapped to the V2X message subframe may be damaged in two following ways. First, 1) on the time domain, the front portion of the V2X message subframe corresponds to the region affected by AGC (automatic gain control). As a result, the bits located in the front end of the V2X message subframe on the time domain are affected by the AGC, thereby corrupting the bits located at the front end of the V2X message subframe. Further, 2) on the time domain, the rear portion of the V2X message corresponds to the region that can be affected by WAN communication. Thus, there is a possibility that the bits located in the rear end of the V2X message subframe on the time domain may be corrupted. An example where the bits located in the front end of the V2X message subframe on the time domain are affected by the AGC, thereby corrupting the bits located at the front end of the V2X message subframe.

Figure 10:
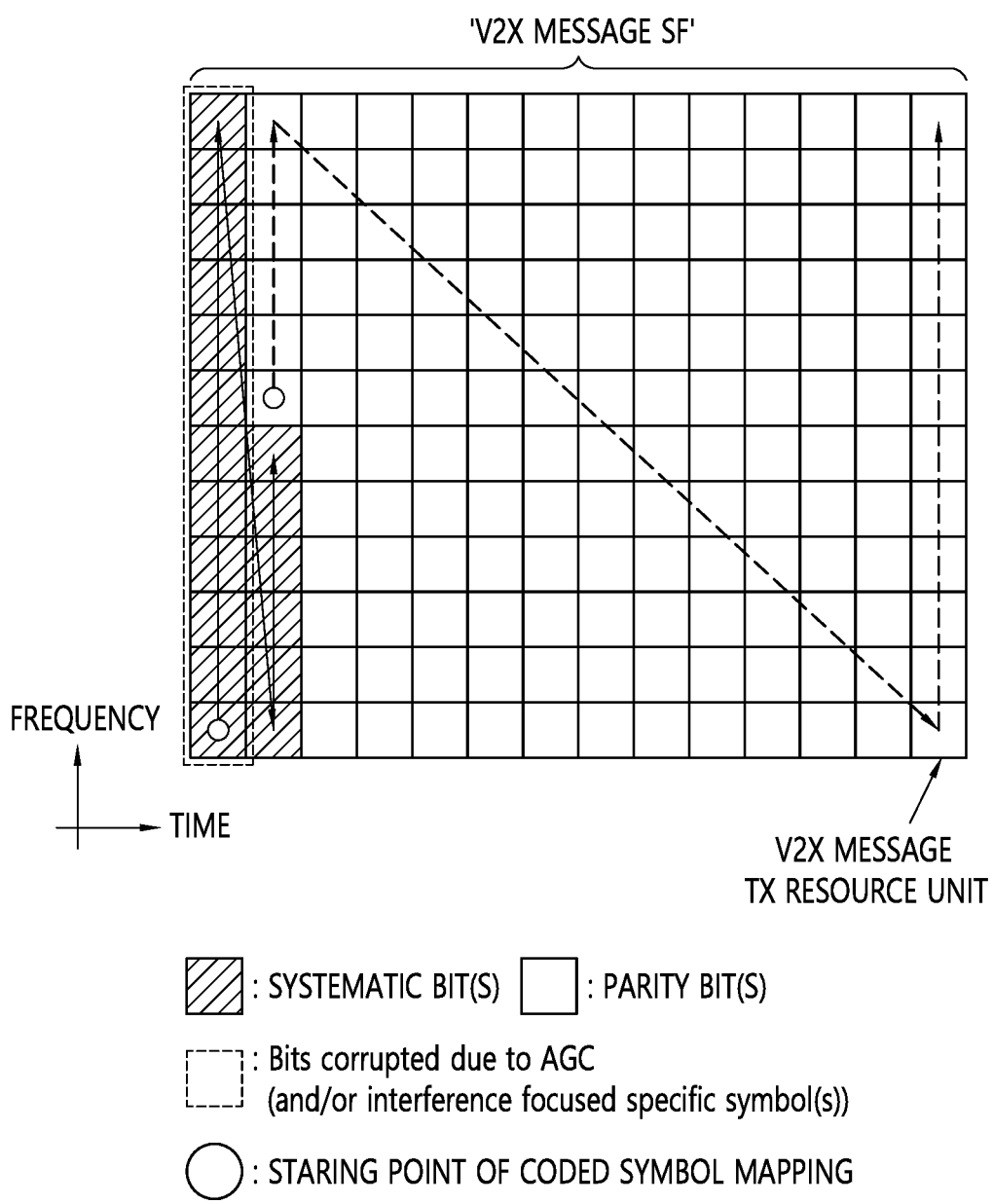
FIG. 10 schematically shows an example in which 'CODED SYMBOL MAPPING' related to the V2X (CONTROL/DATA) message is performed in the form of 'legacy' FREQUENCY FIRST MAPPING'.

FIG. 10 schematically shows an example in which 'CODED SYMBOL MAPPING' related to the V2X (CONTROL/DATA) message is performed in the form of 'legacy' FREQUENCY FIRST MAPPING'.

Referring to FIG. 10, when 'CODED SYMBOL MAPPING' related to the V2X (CONTROL/DATA) message is performed in the form of 'legacy' FREQUENCY FIRST MAPPING', a first symbol on V2X MESSAGE SF is corrupted due to AGC (and/or interference focused on the first symbol). Thus, a 'SYSTEMATIC BIT(S)'(/CODED SYMBOL(S)) of a (relatively) large amount (for example, '12 SYSTEMATIC CODED SYMBOL (S)') mapped to the first symbol may be lost.

Accordingly, the present invention intends to provide a V2X message transmission and/or reception method for solving the above problems. The proposed schemes below propose efficient 'CODED SYMBOL MAPPING' methods when a V2X MESSAGE(S) is sent/received on a pre-defined (or signaled) specific format basis.

In one example, 'OFDM' format-based V2X MESSAGE(S) transmission/reception has following advantages (compared to SC-FDM format-based V2X MESSAGE(S) transmission/reception):

(1) Since RS (REFERENCE SIGNAL) MAPPING is distributed on the time domain, it is possible to more accurately estimate (track) the frequency synchronization (/offset) (in which an error is caused by the Doppler effect or the like); and (2) 'RS DENSITY' is relatively low, which may improve the 'V2X DATA/CONTROL INFORMATION amount that may be transmitted (at one time)' (or 'V2X DATA/CONTROL INFORMATION CODING RATE').

Accordingly, in one example, the corresponding specific format may be configured as 'OFDM' (or 'SC-FDM') format. In this connection, in one example, the term 'CODED SYMBOL(S)' may be interpreted as 'MODULATION SYMBOL(S)' which applies the predefined (or signaled) 'CHANNEL CODING' (for example, TURBO CODING, TBCC) and/or 'MODULATION (for example, QPSK)' to 'INFORMATION (/INPUT) BIT(S)' and then maps the channel coded information bits to 'RE (RESOURCE ELEMENT)'.

Hereinafter, the present invention will be described in more detail with reference to the drawings. In one example, the methods proposed below propose an efficient 'CODED SYMBOL MAPPING' method when 'OFDM' format-based V2X MESSAGE(S) transmission/reception is performed. In this connection, in one example, 'CODED SYMBOL MAPPING' is performed in the form of 'FREQUENCY FIRST MAPPING' in 'OFDM' format-based channel (for example, PDCCH, PDSCH) transmission/reception in case of existing specification. Further, in one example, the proposed methods of the present invention may be extended not only to 'OFDM' format-based V2X message(s) transmission/reception but also to other format-based V2X message(s) transmissions/receptions.

In the following, for convenience of explanation, the specification will be described mainly from the viewpoint of V2X communication. This is not intended to limit the scope of the present invention to the fact that the embodiments are only applied to D2D communication. That is, hereafter, V2X communication may be replaced with D2D communication. The V2X device may be replaced with a D2D device, the V2X message may be replaced with a D2D message, and the V2X subframe may be replaced with a D2D subframe.

Further, in the following, for convenience of explanation, it is assumed that the OFDM format is configured for the subframe. This is merely for convenience of explanation of the present invention. According to the present invention, formats (for example, SC-FDM) different from OFDM may be configured for the subframe.

Figure 11:
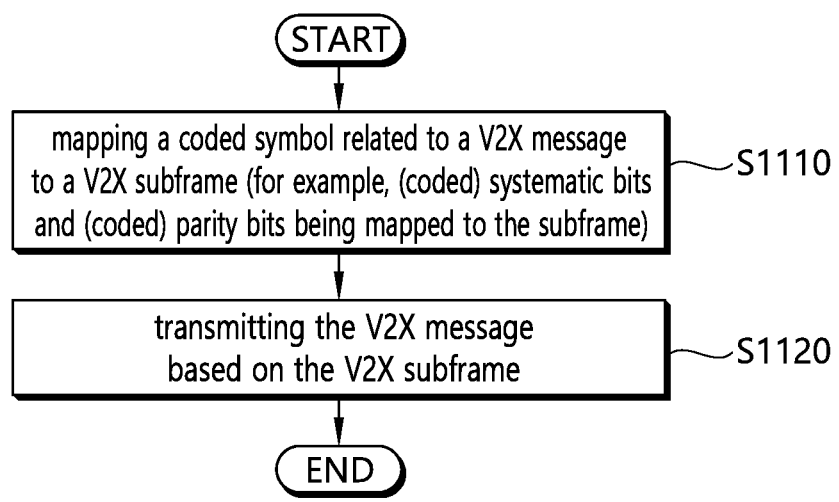
FIG. 11 is a sequence of methods for performing coded symbol mapping according to one embodiment of the present invention.

FIG. 11 is a sequence of methods for performing coded symbol mapping according to one embodiment of the present invention.

According to FIG. 11, the user device may perform coded symbol mapping to a subframe (S1110). That is, the user device may perform coded symbol mapping (for example, systematic bit and/or parity bit mapping) related to the V2X message to a V2X (VEHICLE TO X) subframe.

More specifically,

[Proposed Method #1]

in one example, it may be configured that when 'OFDM' format-based V2X MESSAGE(S) transmission/reception is performed, 'CODED SYMBOL MAPPING' may be performed in the form of 'TIME FIRST MAPPING' (different from the existing 'FREQUENCY FIRST MAPPING' form).

In this connection, in one example, if this rule applies, when the relatively preceding symbol(s) (for example, a first symbol) on the V2X MESSAGE SF (SUBFRAME) cannot be normally transmitted/received, due to reasons such as AGC (AUTOMATIC GAIN CONTROL) (and/or interference focused on specific symbol(S)), the corruption (or transmission/reception failure) of the 'SYSTEMATIC BIT(S)(/CODED SYMBOL(S))' (on the relatively preceding symbol(s)) may be mitigated.

The example in which 'CODED SYMBOL MAPPING' may be performed in the form of 'TIME FIRST MAPPING' (different from the existing 'FREQUENCY FIRST MAPPING' form) will be described as follows.

Figure 12:
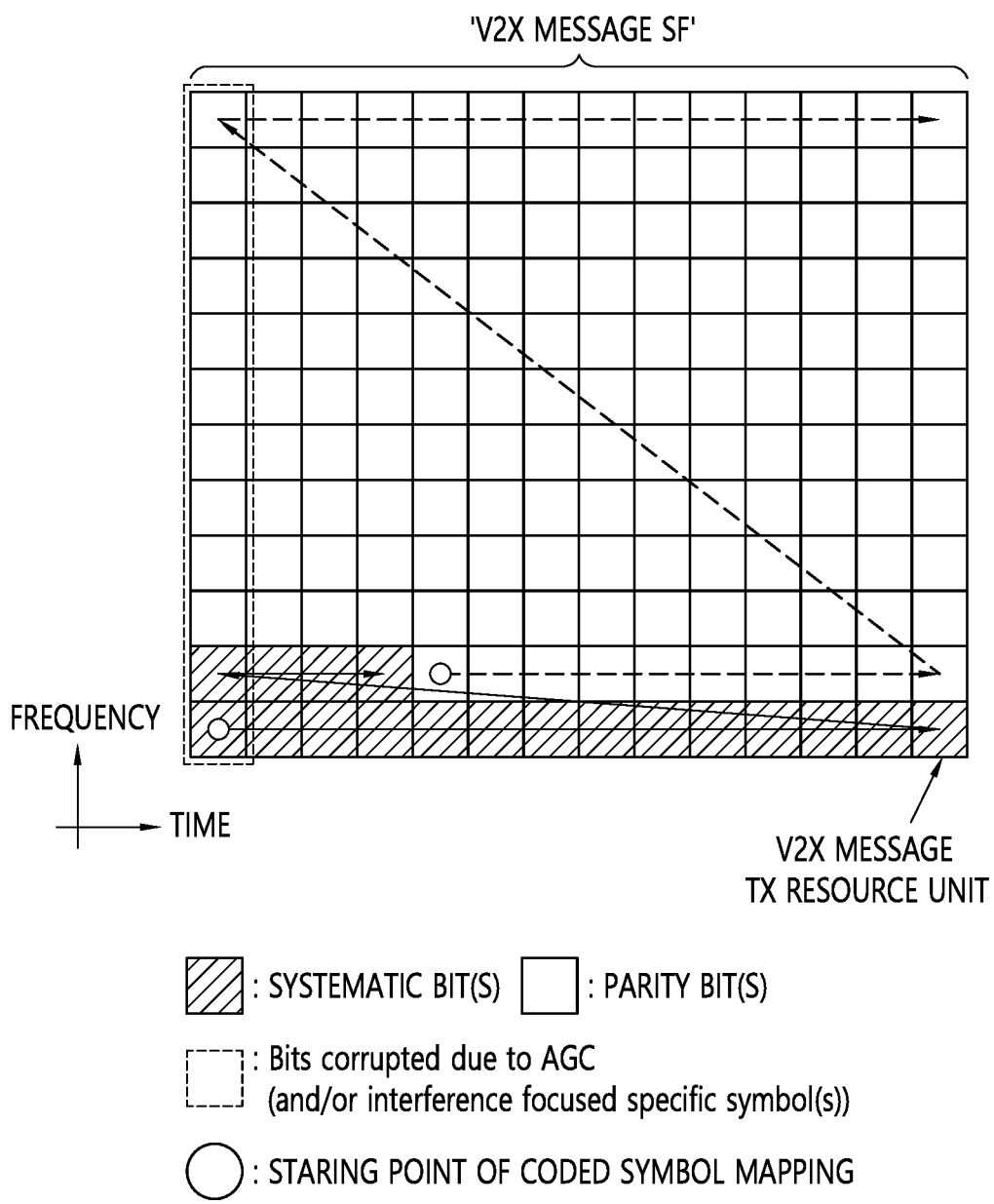
FIG. 12 shows an example of applying the [Proposed method #1].

FIG. 12 shows an example of applying the [Proposed method #1].

Referring to FIG. 12, in this connection, in one example, V2X (CONTROL/DATA) MESSAGE-related 'CODED SYMBOL MAPPING' is performed in the form of 'TIME FIRST MAPPING'. In this example, the amount of 'SYSTEMATIC BIT(S)(/CODED SYMBOL(S))' lost due to the first symbol that is damaged due to reasons including AGC (and/or interference focused on the first symbol) may be reduced to, for example, '2 SYSTEMATIC CODED SYMBOL(S)' compared to 'FREQUENCY FIRST MAPPING' (for example, the example of FIG. 10).

For example, when V2X (CONTROL/DATA) MESSAGE-related 'CODED SYMBOL MAPPING' is performed in the form of 'FREQUENCY FIRST MAPPING', the amount of 'SYSTEMATIC BIT(S)(/CODED SYMBOL(S))' lost due to the first symbol that is damaged due to reasons including AGC (and/or interference focused on the first symbol) may be 12 SYSTEMATIC CODED SYMBOL(S)'. However, when V2X (CONTROL/DATA) MESSAGE-related 'CODED SYMBOL MAPPING' is performed in the form of 'TIME FIRST MAPPING', the amount of 'SYSTEMATIC BIT(S)(/CODED SYMBOL(S))' lost due to the first symbol that is damaged due to reasons including AGC (and/or interference focused on the first symbol) may be 2 SYSTEMATIC CODED SYMBOL(S)'.

Thus, in general, considering the fact that the systematic bit(s) correspond to more important information than the parity bit(s), it is possible to reduce the corruption of the systematic bit(s) of high importance (than the parity bit(s)), thus increasing the efficiency of wireless communication when V2X (CONTROL/DATA) MESSAGE-related 'CODED SYMBOL MAPPING' is not performed in the form of 'FREQUENCY FIRST MAPPING' but is performed in the form of 'TIME FIRST MAPPING'.

Referring back to FIG. 11,

[Proposed Method #2]

in one example, it may be configured such that when 'OFDM' format-based V2X MESSAGE(S) transmission/reception is performed, CODED SYMBOL MAPPING may be performed in accordance with the legacy 'FREQUENCY FIRST MAPPING' form, starting from the pre-defined (or signaled) 'STARTING SYMBOL' position.

The example where when 'OFDM' format-based V2X MESSAGE(S) transmission/reception is performed, CODED SYMBOL MAPPING may be performed in accordance with the legacy 'FREQUENCY FIRST MAPPING' form, starting from the pre-defined (or signaled) 'STARTING SYMBOL' position will be described as follows.

Figure 13:
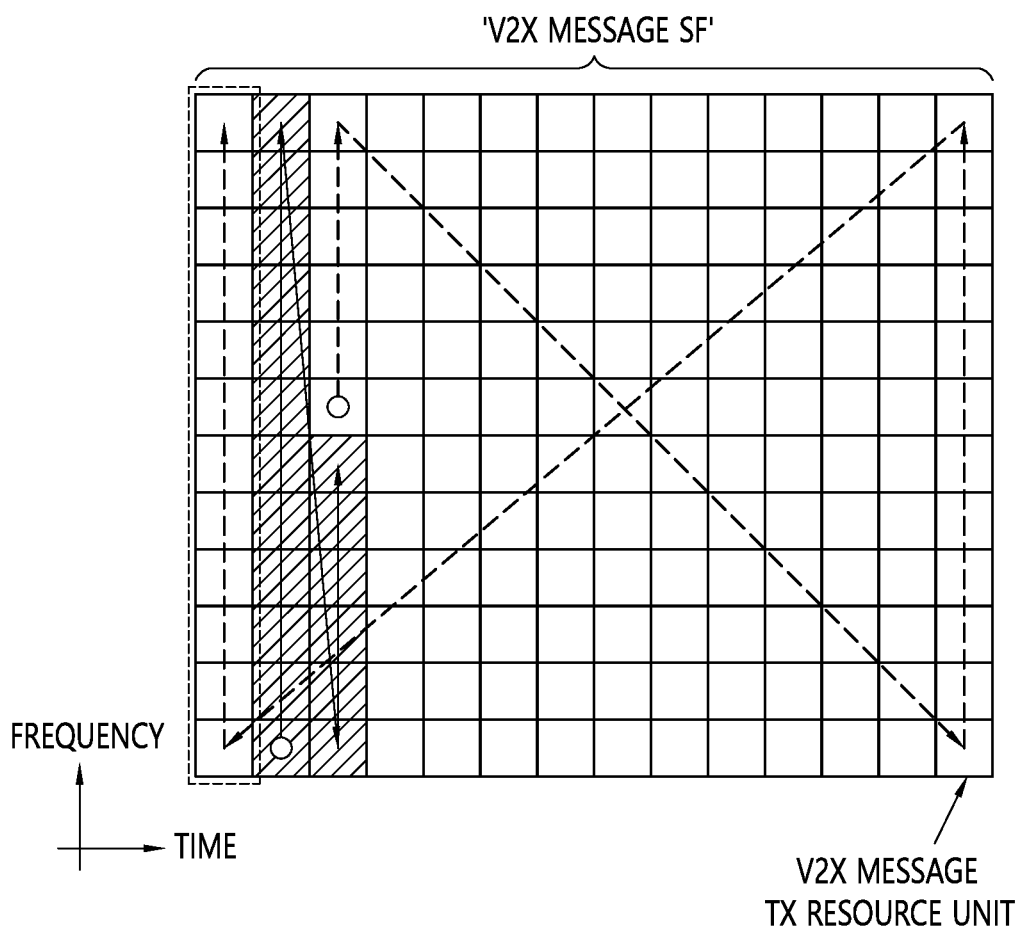
FIG. 13 shows an example of applying the [Proposed method #2].

FIG. 13 shows an example of applying the [Proposed method #2].

Referring to FIG. 13, in this connection, in one example, V2X (CONTROL/DATA) MESSAGE(S)-related '(CODED SYMBOL MAPPING) STARTING SYMBOL' position may be assumed to be defined or signaled to be a second symbol.

In this connection, in one example, via application of the [Proposed method #2], the amount of SYSTEMATIC BIT(S)(/CODED SYMBOL(S)) lost due to the first symbol being damaged due to AGC (and/or interference focused on the first symbol) may be reduced to, for example, 0 'SYSTEMATIC CODED SYMBOL(S)', compared to when the [Proposed method #1] is applied (and/or in the case of FIG. 10).

Referring back to FIG. 11,

[Proposed Method #3]

in one example, it may be configured such that, when 'OFDM' format-based V2X MESSAGE(S) transmission/reception is performed, 'PARITY BIT(S)-related CODED SYMBOL(S) MAPPING' is performed first from the pre-defined (or signaled) 'CODED SYMBOL MAPPING' STARTING SYMBOL position, and, thereafter, 'SYSTEMATIC BIT(S)'-related CODED SYMBOL(S) MAPPING' is performed (continuously).

Figure 14:
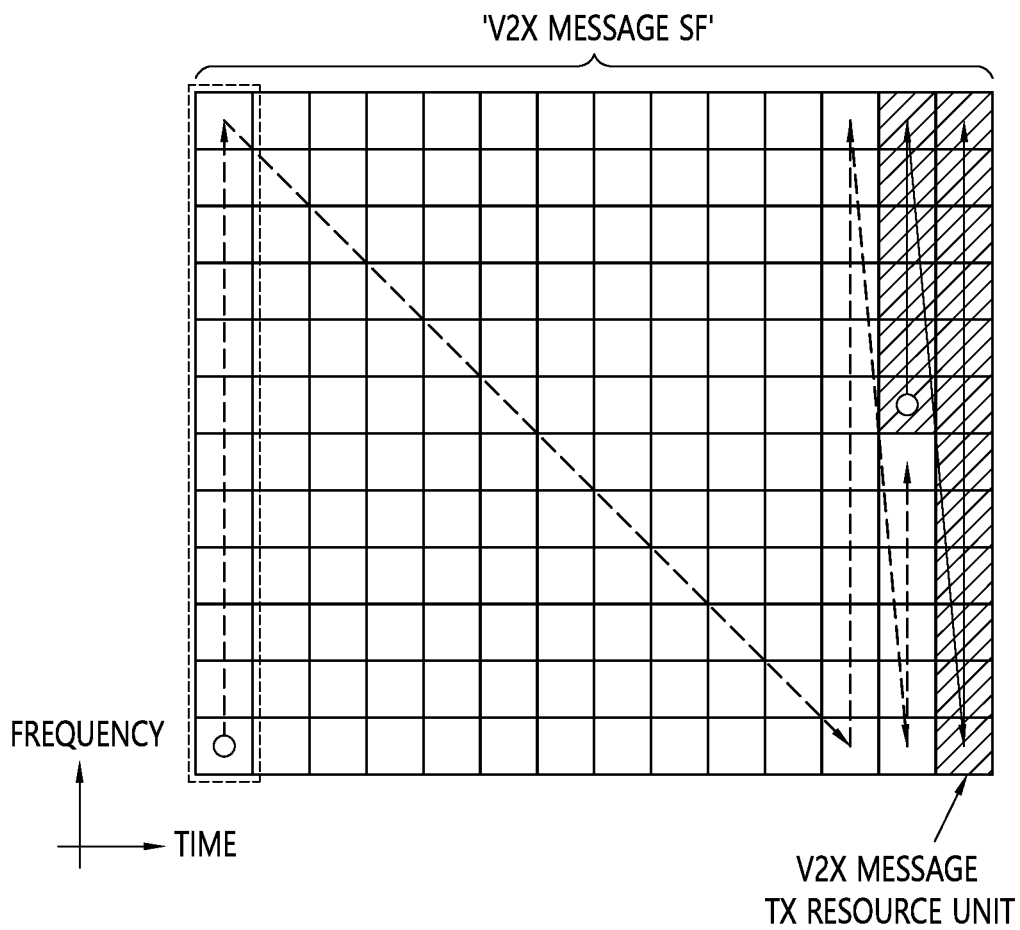
FIG. 14 shows an example of applying the [Proposed method #3]

FIG. 14 shows an example of applying the [Proposed method #3]

In this connection, in one example, it may be assumed that V2X (CONTROL/DATA) MESSAGE(S)-related '(CODED SYMBOL MAPPING) STARTING SYMBOL' position may be defined or signaled to be a first symbol.

In this connection, in one example, via application of the [Proposed method #3], the amount of SYSTEMATIC BIT(S)(/CODED SYMBOL(S)) lost due to the first symbol being damaged due to AGC (and/or interference focused on the first symbol) may be reduced to, for example, 0 'SYSTEMATIC CODED SYMBOL(S)', compared to when the

[Proposed method #1] is applied (and/or in the case of FIG. 10).

Referring back to FIG. 11,

When V2X message transmission and/or reception is performed, WAN communication may be performed in the last symbol region of the subframe on which V2X is performed. Therefore, when 'SYSTEMATIC BIT(S)'-related CODED SYMBOL(S) MAPPING' is performed on the last symbol region of the subframe, the systematic bit(s) may be corrupted by WAN communication. To cope with this problem, the following method is proposed.

[Proposed Method #4]

In one example, it may be configured such that when 'OFDM' format-based V2X MESSAGE(S) transmission/reception is performed, 'SYSTEMATIC BIT(S)'-related CODED SYMBOL(S) MAPPING' may be applied to symbols prior to the last symbol of the subframe. That is, it may be configured such that the 'SYSTEMATIC BIT(S)'-related CODED SYMBOL(S) MAPPING' may be performed for the remaining symbol regions except for the first symbol and the last symbol of the subframe.

Figure 15:
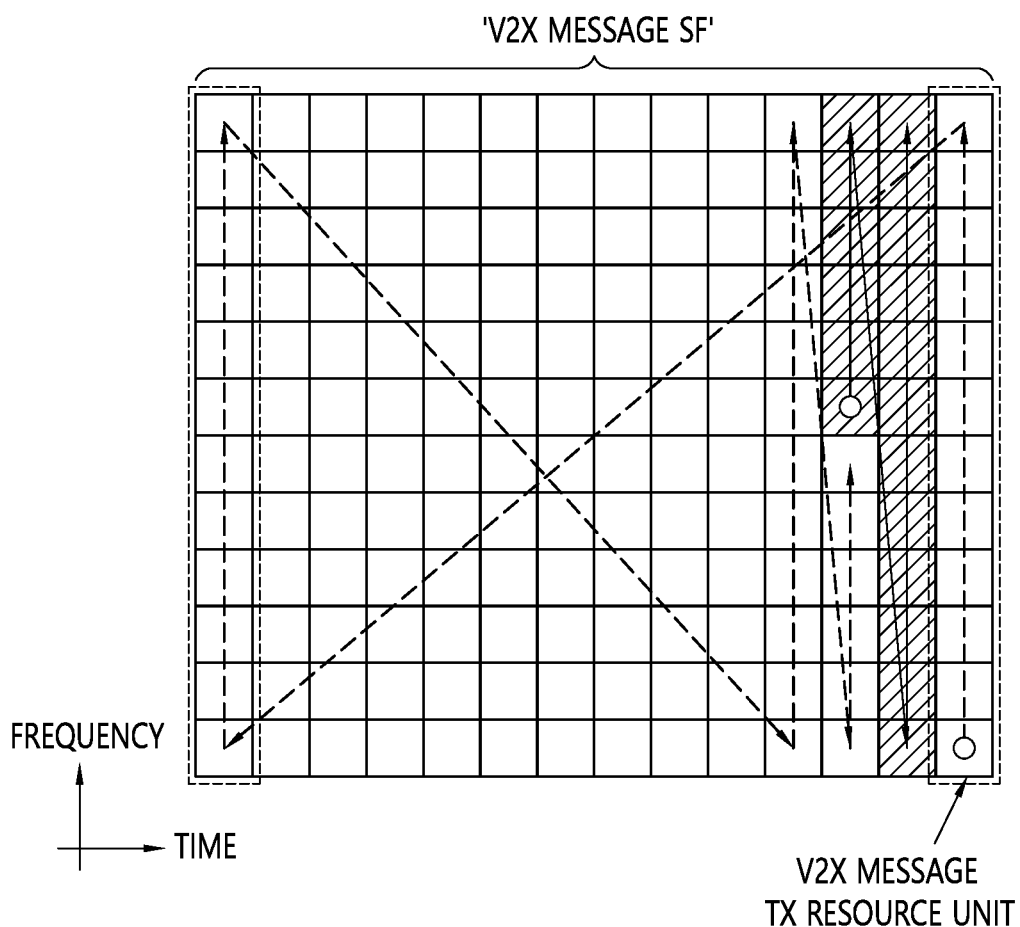
FIG. 15 is an example of a case where the [Proposed method #4] is applied.

FIG. 15 is an example of a case where the [Proposed method #4] is applied.

Referring to FIG. 15, it may be configured such that when 'OFDM' format-based V2X MESSAGE(S) transmission/reception is performed, 'SYSTEMATIC BIT(S)'-related CODED SYMBOL(S) MAPPING' may be applied to symbols prior to the last symbol of the subframe in the remaining symbol regions except for the first symbol and the last symbol of the subframe.

More specifically, it may be configured such that, when 'OFDM' format-based V2X MESSAGE(S) transmission/reception is performed, 'PARITY BIT(S)-related CODED SYMBOL(S) MAPPING' is performed first from the last symbol of the subframe, and, thereafter, 'SYSTEMATIC BIT(S)'-related CODED SYMBOL(S) MAPPING' is performed (continuously).

According to the [Proposed method #4] above, the corruption of the systematic bit(s) may be reduced to zero.

Thereafter, the user device may transmit the V2X message based on the subframe (S1120). That is, the user device may transmit the V2X message to the network based on the V2X subframe to which the (coded) systematic bit(s) and (coded) parity bit (s) are mapped.

In addition, [Proposed method #5] in one example, it may be configured such that, if some or all of the proposed methods (for example, [Proposed method #1], [Proposed method #2], [Proposed method #3], [Proposed method #4]) are applied, the RS (SEQUENCE) used in 'Channel estimation operation for V2X (CONTROL/DATA) MESSAGE decoding (/detection)' and in the "frequency (/time) synchronization (/offset) estimation (/tracking) operation" may be subjected to 'FREQUENCY FIRST MAPPING' form regardless of (V2X (CONTROL/DATA) MESSAGE-related 'CODED SYMBOL MAPPING DIRECTION (for example, 'TIME FIRST MAPPING', 'FREQUENCY FIRST MAPPING')'.

In another example, it may be configured such that, if some or all of the proposed methods (for example, [Proposed method #1], [Proposed method #2], [Proposed method #3], [Proposed method #4]) is applied, the RS (SEQUENCE) used in 'Channel estimation operation for V2X (CONTROL/DATA) MESSAGE decoding (/detection)' and in the "frequency (/time) synchronization (/offset) estimation (/tracking) operation" may be subjected to V2X (CONTROL/DATA) MESSAGE-related 'CODED SYMBOL MAPPING DIRECTION (for example, 'TIME FIRST MAPPING', 'FREQUENCY FIRST MAPPING').

In another still example, it may be configured such that different formats (for example, OFDM, SC-FDM) and/or CODED SYMBOL MAPPING DIRECTION (/METHOD) may be applied to between some or all of the different V2X MESSAGE CHANNEL(S)/SIGNAL(S).

It is obvious that examples of the proposed method described above may also be included as one of the implementation methods of the present invention, and thus may be regarded as a kind of proposed methods. Further, the proposed schemes described above may be implemented independently, but may also be implemented as a combination (or merging) of some of the proposed schemes. In the present invention, the proposed method is based on the 3GPP LTE system for the convenience of explanation, but the range of the system to which the proposed method is applied may be extended to another system in addition to the 3GPP LTE system. In one example, the proposed methods of the present invention may be extended to D2D communication. In this connection, in one example, D2D communication means that the UE communicates directly with another UE using a wireless channel. In this connection, the UE refers to the user device. The present disclosure may not be limited thereto. A network device such as the base station may also be regarded as a kind of UE when the network device such as the base station transmits/receives signals according to the communication protocols between UEs.

Figure 16:
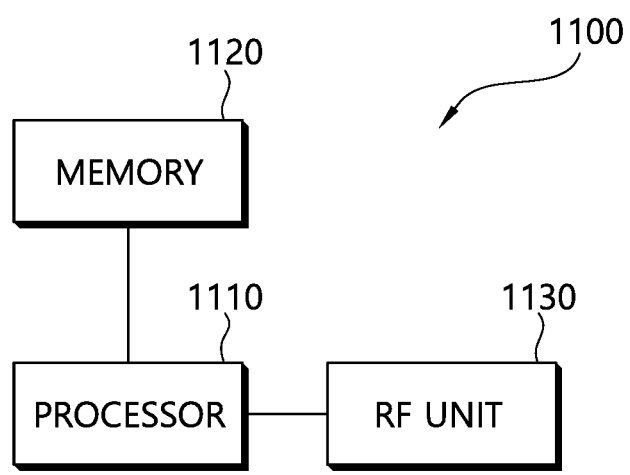
FIG. 16 is a block diagram illustrating the user device in which an embodiment of the present invention is implemented.

FIG. 16 is a block diagram illustrating the user device in which an embodiment of the present invention is implemented.

Referring to FIG. 16, the user device 1100 includes a processor 1110, a memory 1120, and a radio frequency unit 1130. For example, the processor 1110 may perform coded symbol mapping on a subframe. Further, the processor 1110 may transmit a V2X message based on the subframe.

The RF unit 1130 is connected to the processor 1110 to transmit and receive radio signals.

The processor may comprise an application-specific integrated circuit (ASIC), other chipset, logic circuitry and/or a data processing device. The memory may include read-only memory (ROM), random access memory (RAM), flash memory, memory card, storage media and/or other storage devices. The RF unit may include a baseband circuit for processing the radio signal. When the embodiment is implemented in software, the above-described techniques may be implemented with modules (processes, functions, etc.) that perform the functions described above. The module may be stored in memory and executed by the processor. The memory may be internal or external to the processor, and may be coupled to the processor by any of a variety of well known means.

What is claimed is:

1. A method for transmitting a Vehicle to X (V2X) message in a wireless communication system, the method performed by a user equipment (UE) and comprising:
    mapping at least one coded symbol related to the V2X message to a subframe; and
    transmitting the V2X message based on the subframe,
    wherein a plurality of systematic bits and a plurality of parity bits are mapped to the subframe based on mapping the at least one coded symbol,
    wherein the subframe includes a plurality of symbols along a time axis,
    wherein the plurality of systematic bits are mapped to a symbol other than a first symbol and a last symbol among the plurality of symbols in the subframe, wherein the mapping is performed in a frequency axis direction from a pre-defined symbol among the plurality of symbols of the subframe, wherein the plurality of parity bits are mapped in a frequency axis direction to the last symbol, and wherein the plurality of systematic bits are mapped in the frequency axis direction up to a symbol just before the last symbol.

2. The method of claim 1, wherein the subframe is configured based on an Orthogonal Frequency Division Multiplexing (OFDM) format.

3. The method of claim 1, wherein the V2X message is a Device To Device (D2D) message.

4. A user equipment (UE) for transmitting a Vehicle to X (V2X) message comprising:

a transceiver configured to transmit and receive a radio signal; and a processor coupled to the transceiver, wherein the processor is configured to:

map at least one coded symbol related to the V2X message to a subframe; and control the transceiver to transmit the V2X message based on the subframe, wherein a plurality of systematic bits and a plurality of parity bits are mapped to the subframe based on mapping the at least one coded symbol, wherein the subframe includes a plurality of symbols along a time axis, wherein the plurality of systematic bits are mapped to a symbol other than a first symbol and a last symbol among the plurality of symbols in the subframe, wherein the mapping is performed in a frequency axis direction from a pre-defined symbol among the plurality of symbols of the subframe, wherein the plurality of parity bits are mapped in a frequency axis direction to the last symbol, and wherein the plurality of systematic bits are mapped in the frequency axis direction up to a symbol just before the last symbol.

* * * * *